United States Patent [19]

Davis et al.

[11] Patent Number: 5,407,267

[45] Date of Patent: Apr. 18, 1995

[54] METHOD AND APPARATUS FOR FORMING AND DISPENSING COATING MATERIAL CONTAINING MULTIPLE COMPONENTS

[75] Inventors: Dennis Davis, Bay Village; Harold D. Beam, Oberlin; Jeffrey J. Kruke, Lorain, all of Ohio

[73] Assignee: Nordson Corporation, Westlake, Ohio

[21] Appl. No.: 998,584

[22] Filed: Dec. 30, 1992

[51] Int. Cl.[6] ............. G05D 11/02; G05D 11/13; C08J 3/12
[52] U.S. Cl. ................................. 366/152; 366/160.1; 366/182.4; 239/71; 239/410; 239/412; 137/98; 137/100; 137/101.19; 137/101.21; 422/111
[58] Field of Search .............. 239/71, 412; 366/152, 366/160; 137/98, 100, 101.19, 101.21; 422/111

[56] References Cited

U.S. PATENT DOCUMENTS

| | | | |
|---|---|---|---|
| 1,483,225 | 2/1924 | Hammett | 73/861.92 |
| 1,511,765 | 10/1924 | Latham | 73/861.92 |
| 1,585,255 | 5/1926 | McFadden | 73/861.92 |
| 3,229,077 | 1/1966 | Gross | 364/510 |
| 3,429,480 | 2/1969 | Petyt | 222/26 |
| 3,651,989 | 3/1972 | Westrich | 222/14 |
| 3,751,644 | 8/1973 | Mayer | 364/502 |
| 3,764,069 | 10/1973 | Runstadler, Jr. et al. | 239/8 |
| 3,777,935 | 12/1973 | Storey | 222/16 |
| 3,921,901 | 11/1975 | Woodman | 239/13 |
| 3,967,634 | 7/1976 | Scherer | 137/99 |
| 4,019,653 | 4/1977 | Scherer | 222/1 |
| 4,046,287 | 9/1977 | Hoekstra | 222/16 |
| 4,059,466 | 11/1977 | Scholl et al. | 156/78 |
| 4,059,714 | 11/1977 | Scholl et al. | 428/317.5 |
| 4,116,364 | 9/1978 | Culbertson | 222/40 |
| 4,156,754 | 5/1979 | Cobbs, Jr. et al. | 428/306.6 |
| 4,193,745 | 3/1980 | Hamilton et al. | 418/9 |
| 4,200,207 | 4/1980 | Akers et al. | 222/190 |
| 4,209,258 | 6/1980 | Oakes | 366/152 |
| 4,247,581 | 1/1981 | Cobbs, Jr. et al. | 427/373 |
| 4,259,402 | 3/1981 | Cobbs, Jr. et al. | 428/317.5 |
| 4,265,858 | 5/1981 | Crum et al. | 422/129 |
| 4,288,741 | 9/1981 | Dechene et al. | 324/664 |
| 4,301,119 | 11/1981 | Cobbs, Jr. et al. | 422/133 |
| 4,350,266 | 9/1982 | Hetherington | 222/40 |
| 4,371,096 | 2/1983 | Scholl et al. | 222/190 |
| 4,405,063 | 9/1983 | Wydro et al. | 222/146.5 |
| 4,423,161 | 12/1983 | Cobbs, Jr. et al. | 521/73 |
| 4,483,463 | 11/1984 | Buschmann | 222/64 |

(List continued on next page.)

FOREIGN PATENT DOCUMENTS

| | | |
|---|---|---|
| 0246797 | 11/1987 | European Pat. Off. |
| 0259689 | 3/1988 | European Pat. Off. |
| 0321607 | 6/1989 | European Pat. Off. |
| 0350909 | 1/1990 | European Pat. Off. |
| 0350910 | 1/1990 | European Pat. Off. |
| 0388927 | 3/1990 | European Pat. Off. |
| 0388915 | 9/1990 | European Pat. Off. |
| 0388916 | 9/1990 | European Pat. Off. |
| 0388923 | 9/1990 | European Pat. Off. |

*Primary Examiner*—Paul R. Michl
*Assistant Examiner*—Andrew E. C. Merriam
*Attorney, Agent, or Firm*—Holland & Knight

[57] ABSTRACT

A method and apparatus for combining multiple components to form a coating material formulation in which one of the components is a resin, another component is a supercritical fluid employed as a fluid diluent, and, preferably, the third component is a catalyst. Two of the components are transmitted through separate flow paths to a first mixer within which they are combined to form a mixture, and then the third component is added to the mixture in a second mixer to form the coating material formulation for discharge by one or more coating dispensers or spray guns onto a substrate.

17 Claims, 3 Drawing Sheets

U.S. PATENT DOCUMENTS

| | | | |
|---|---|---|---|
| 4,505,405 | 3/1985 | Kelly | 222/135 |
| 4,505,406 | 3/1985 | Cobbs, Jr. et al. | 222/135 |
| 4,505,957 | 3/1985 | Cobbs, Jr. et al. | 427/422 |
| 4,516,725 | 5/1985 | Cavanaugh | 239/127 |
| 4,522,789 | 6/1985 | Kelly et al. | 422/133 |
| 4,527,712 | 7/1985 | Cobbs, Jr. et al. | 222/1 |
| 4,553,701 | 11/1985 | Rehman et al. | 239/432 |
| 4,601,645 | 7/1986 | Schmitkons | 418/9 |
| 4,630,774 | 12/1986 | Rehman et al. | 239/8 |
| 4,632,314 | 12/1986 | Smith et al. | 239/433 |
| 4,654,802 | 3/1987 | Davis | 364/502 |
| 4,705,461 | 11/1987 | Clements | 417/387 |
| 4,717,582 | 1/1988 | Kotoye et al. | 427/8 |
| 4,734,451 | 3/1988 | Smith | 524/493 |
| 4,778,631 | 10/1988 | Cobbs, Jr. et al. | 261/128 |
| 4,779,762 | 10/1988 | Klein et al. | 222/52 |
| 4,882,107 | 11/1989 | Cavender et al. | 264/51 |
| 5,009,367 | 4/1991 | Nielsen | 239/1 |
| 5,027,742 | 7/1991 | Lee et al. | 427/385.5 |
| 5,057,342 | 10/1991 | Hoy et al. | 427/422 |
| 5,071,562 | 12/1991 | Allington et al. | 366/162 |
| 5,088,443 | 2/1992 | Hastings et al. | 118/314 |
| 5,098,194 | 3/1992 | Kuo et al. | 366/152 |
| 5,106,659 | 4/1992 | Hastings et al. | 427/421 |
| 5,171,613 | 12/1992 | Bok et al. | 239/11 |

METHOD AND APPARATUS FOR FORMING AND DISPENSING COATING MATERIAL CONTAINING MULTIPLE COMPONENTS

This application relates to U.S. patent application Ser. No. 07/999,284 entitled "Method and Apparatus for Dispensing Coating Material Including a Catalyst" to Davis, et al., filed on the same date as this application, which is owned by the assignee of this invention.

FIELD OF THE INVENTION

This invention relates to coating systems, and, more particularly, to a method and apparatus for combining a liquid coating composition or resin, a supercritical fluid, and, preferably, a third component such as a catalyst, in order to produce a coating material solution or formulation wherein the proportion of supercritical fluid and catalyst are adjusted in direct relation to the pressure of the resin and by a comparison of the actual ratio of the resin flow to the flow of each of such components, with predetermined, desired ratios.

BACKGROUND OF THE INVENTION

In recent years, substantial efforts have been expended in the coating and finishing industry to reduce the organic solvent content of coating materials such as paint in order to avoid adverse environmental effects created by the solvents. Even high solids coating compositions, having a solids content of up to 60% percent by volume, include liquid solvent components which can escape during handling, atomization or deposition on a substrate, thus creating environmental and health hazards.

It has previously been proposed in Cobb's U.S. Pat. No. 4,247,581 to reduce the solvent content in paint by mixing a liquid or gas-blowing agent into the paint to produce an easily-atomized, foamed solution just prior to the spray orifice of a dispenser. Rehman, et al. U.S. Pat. No. 4,630,774, improved on this concept by designing a foaming chamber and turbulence-inducing device into the dispenser to better control the formation of the foam prior to the spray orifice. U.S. Pat. Nos. 4,505,406; 4,505,957; and 4,527,712 also disclose concepts for intermixing liquid or gas-blowing agents into paint formulations to reduce solvents.

More recently, U.S. Pat. No. 4,923,720 to Lee, et al. disclosed a method and apparatus for the production of a coating formulation in which a substantial amount of the liquid solvent component is removed and replaced with a supercritical fluid such as supercritical carbon dioxide which functions as a diluent to enhance the application properties of the coating formulation. The supercritical carbon dioxide and some liquid solvent material, e.g. about two-thirds less than is required in other coating compositions, are intermixed with polymeric and pigmentary solids to form a coating material solution or formulation having a viscosity which facilitates atomization through an airless coating dispenser. As the coating material formulation is discharged from the dispensing device toward a substrate, the supercritical carbon dioxide "flashes off" or vaporizes to assist in atomization of the high solids coating composition and to reduce drying time of the composition on the substrate. Such coating material formulation, like the earlier prior art, has the advantage of substantially reducing the adverse environmental effects caused by coating compositions having a high solvent content.

The Lee, et al. U.S. Pat. No. 4,923,720 discloses an apparatus in which a liquid coating composition and a supercritical fluid are supplied from separate sources to a mixer wherein the two components are combined to form a coating material solution or formulation which is delivered to one or more coating dispensers for deposition onto a substrate. In the embodiment of the system disclosed in the Lee, et al. patent, the liquid coating composition and supercritical fluid are each introduced into the system by a separate piston pump. These two piston pumps are slaved together by a shaft which extends between the pistons of the two pumps, and the shaft position is adjusted to control the length of the piston stroke in each pump. The length of each piston stroke, in turn, governs the volume of the liquid coating composition and the volume of the supercritical fluid entering the system.

A number of problems with the design described in U.S. Pat. No. 4,923,720 have been addressed in U.S. patent application Ser. No. 07/728,051 filed Jul. 15, 1991 entitled "Method and Apparatus for Forming and Dispensing Single and Multiple Phase Coating Material Containing Fluid Diluent" to Saidman, et al., which is owned by the assignee of this invention. As noted in that application, a principal limitation of the system of U.S. Pat. No. 4,923,720 is that control of the relative proportion of liquid coating composition to supercritical fluid is difficult. This is because adjustment of the volume of one material entering the system automatically produces an adjustment of the volume of the other material since the two piston pumps which introduce such materials are slaved together by a common shaft. No provision is made in the Lee, et al. system for adjustment of the volume of one material introduced into the system independently of the other, and/or to take into account such variables as pump cavitation, fluid viscosity, leakage of supercritical fluid, uneven mixing of the supercritical fluid and liquid coating composition and other variables.

The invention disclosed in patent application Ser. No. 07/728,051 overcomes many of these problems with a system in which supercritical fluid and liquid coating composition or resin are introduced from separate sources into a loop or continuously-circulating flow path wherein the two materials are combined to form a coating material solution or formulation which is then supplied to coating dispensers for deposition onto a substrate. In order to maintain the proper proportion of supercritical fluid and resin, a control system is provided which monitors a parameter of the formulation which can be correlated to either the fluid diluent content or the resin content of the formulation. In the preferred embodiment of Ser. No. 07/728,051, such control system includes a capacitor located downstream from a point at which the fluid diluent and resin are intermixed. This capacitor forms part of a capacitance bridge or capacitance sensing circuit which produces a signal corresponding to the dielectric constant of the mixture. This dielectric constant can be correlated to the fluid diluent content of the mixture, and, depending upon the capacitance sensed by the capacitor, a control valve is operated by a computer associated with the capacitance sensing circuit to adjust the flow of supercritical fluid supplied to the loop so that a predetermined proportion or ratio of supercritical fluid-to-resin is maintained.

One potential problem with systems of the type disclosed in Ser. No. 07/728,051 can occur in applications wherein a fluctuating demand for the formulation is required. For example, in some applications, a number of coating dispensers may be intermittently turned on or off, and/or dispensers may be operated independently of one another such that different numbers of dispensers are turned on while others are not operating. As noted above, the system of Ser. No. 07/728,051 maintains the proper ratio of supercritical fluid-to-resin by first intermixing these components within a circulating flow path or loop, sensing the capacitance of the mixture and then adjusting the quantity of supercritical fluid introduced into the loop dependent upon the sensed capacitance. But there may be instances where the demand for the formulation is so high, e.g. by suddenly turning on a large number of dispensers, that the mixture of supercritical fluid and resin cannot be circulated around the loop in order to sense its capacitance and adjust the input of supercritical fluid before the mixture must be discharged to the coating dispensers. As a result, the relative proportion of supercritical fluid-to-resin may not be maintained as precisely as desired during such periods of widely-fluctuating flow requirements.

Another potential problem with systems of the type disclosed in the Lee U.S. Pat. No. 4,923,720, and Ser. No. 07/728,051, is that color change operations are relatively time consuming and difficult. This is because in systems of this type, both the resin and supercritical fluid are introduced into a common circulating flow path or loop where they are combined prior to discharge to one or more coating dispensers. In order to change from a resin of one color to another, the entire loop must be flushed of the old resin, including each element within such loop, before a new colored resin can be introduced into the system. This operation can be time consuming and, hence, unacceptable for certain applications.

In addition to the foregoing, systems of the type disclosed in the Lee, et al. U.S. Pat. No. 4,923,720, and application Ser. No. 07/728,051 to Saidman, et al., are intended to form coating material formulations or mixtures comprising resin and supercritical fluid as a diluent. No provision is made for the addition of other components or for controlling the proportion of such other components in the overall mixture. In certain applications, such as, for example, when rapid drying time is advantageous, "two component" coating material formulations such as paints are desirable. Two component paints generally comprise a "high volume component" consisting of polymeric pigmentary solids and organic solvents, and a "low volume component" such as a catalyst. Depending upon the particular resin employed, the ratio of resin-to-catalyst can be on the order of up to 100 to 1, and the flow rate of the catalyst can be as small as 3 ccm/min. Not only do the Lee, et al. and Saidman, et al. systems fail to contemplate the addition of a third component within the circulation flow path or loop, but neither system is designed to accommodate the high ratios and low flow volume required for some two component paints.

SUMMARY OF THE INVENTION

It is therefore among the objectives of this invention to provide a method and apparatus of forming coating material formulations or mixtures which is capable of intermixing and controlling the relative proportion of each of at least three components, which is capable of maintaining the desired ratio even during fluctuating flow requirements for the formulation, which is capable of accommodating high component ratios and low flow volume of one or more components, which allows for rapid color change, and, which is relatively inexpensive to fabricate and operate.

These objectives are accomplished in a method and apparatus for combining multiple components to form a coating material formulation in which one of the components is a resin, another component is a supercritical fluid employed as a fluid diluent, and, preferably, a third component is added such as a catalyst. Two of the components are transmitted through separate flow paths to a first mixer within which they are combined to form a mixture, and then the third component is added to the mixture in a second mixer to form the coating material formulation for discharge by one or more coating dispensers or spray guns onto a substrate.

One aspect of this invention is predicated upon the concept of obtaining accurate control of the resin-to-supercritical fluid ratio, and the resin-to-catalyst ratio, by controlling the duty cycle or "valve on" time of a supercritical fluid valve contained within the supercritical fluid flow path and a catalyst valve contained within the catalyst flow path. As described in detail below, each of the supercritical fluid and catalyst flow paths includes an analog controller operatively connected to the resin flow path. An initial set-up or calibration procedure is undertaken, the details of which are described below, in order to account for flow properties of a particular resin to be dispensed by the system, and to account for the inherent delays caused by physical movement of both the supercritical fluid valve and catalyst valve after receiving signals to open and close. This calibration procedure results in the determination of a system offset or delay value which is input to each of the analog controllers. In turn, the analog controllers operate the supercritical fluid valve and catalyst valve to obtain an essentially straight line relationship between valve on-time and resin flow rate during operation of not only one coating dispenser, but multiple coating dispensers, as required for a particular application.

Each of the analog controllers operates their respective valves so that the appropriate proportion of supercritical fluid and catalyst is combined with the resin regardless of flow requirements of the system, i.e. irrespective of how many dispensers are operating at any given time. To provide such control, each analog controller performs essentially two distinct control functions, both of which are dependent on the flow of resin within the resin flow path. One function is an essentially immediate response to the initiation of spraying through one or more dispensers, and, in turn, flow of resin through the flow meter. A signal from the resin flow meter representative of such resin flow is transmitted to each of the analog controllers which virtually immediately produce an output signal to open their respective valves and allow the appropriate volume of supercritical fluid and catalyst to flow to the mixers for combination with the resin. As a result, the operation of both the supercritical fluid valve and catalyst valve is immediately and accurately controlled as a function of the flow of resin through the resin flow path.

A second control function performed by each of the analog controllers involves a periodic correction of the respective supercritical fluid and catalyst flows during operation of the system. Each of the flow paths for the individual components includes a flow meter to which the components are transmitted before entering the mixers. In order to control the flow volume of supercritical fluid, for example, signals are obtained from both the resin and supercritical fluid flow meters which are representative of actual flows of resin and supercritical fluids through their respective flow paths. The ratio of such actual flow rates is compared to a predetermined, desired ratio within a ratio comparator which is effective to produce an output or error signal representative of the difference between the desired and actual ratios. The analog controller associated with the supercritical flow path processes this error signal, in a manner described below, and produces a signal which is input to a valve driver circuit connected to a fluid valve contained within the supercritical fluid flow path. The valve driver circuit is effective to control the duty cycle of the supercritical fluid valve, e.g. a solenoid valve, such that the flow rate of supercritical fluid to the mixer is periodically adjusted in accordance with any variation between the actual ratio of resin-to-supercritical fluid and the desired ratio.

This same control function is performed in order to obtain the desired proportion of a catalyst within the mixture of resin, supercritical fluid and catalyst. The duty cycle of the catalyst valve contained within the catalyst flow path is controlled in the same manner as the duty cycle of the fluid valve associated with the supercritical flow path. Signals are obtained from both the resin and catalyst flow meters which represent actual flow rates thereof, and the ratio of such actual flow rates is compared to a predetermined, desired ratio within a second ratio comparator operative to produce an error signal representative of the difference between the desired and actual ratios. The analog controller within the catalyst flow path includes a valve driver circuit of the same type employed in the supercritical circuit which is operative to control the duty cycle of the catalyst valve such that a corrected or adjusted volume of catalyst is discharged from the catalyst valve dependent upon the aforementioned error signal.

Another aspect of this invention involves obtaining rapid correction of the relative proportion of each of the three components by adjusting the pressure of the lower volume components, e.g. the supercritical fluid and catalyst, in direct response to fluctuation in pressure of the higher volume component, e.g. the resin. In response to the demand for coating material formulation, such as by activating multiple dispensers or spray guns, a required amount of resin is emitted from a flow meter at a predetermined pressure to the mixer. A pressure sensor connected to the resin flow line senses the pressure at which the resin is delivered to the mixer and a fluid signal representative of this pressure is transmitted to a differential pressure regulator located within each of the separate flow paths carrying the supercritical fluid and the catalyst. The two differential pressure regulators are effective to emit the supercritical fluid and catalyst, respectively, at pressure levels which are directly proportionate to the pressure level within the resin flow path. In the supercritical fluid flow path, for example, the supercritical fluid is maintained above its critical pressure, but a variation in the pressure at which the supercritical fluid is emitted from the differential pressure regulator causes a proportionate difference in the volumetric flow rate of the supercritical fluid to the mixer for combination with the resin. The flow volume of the catalyst is controlled in the same manner wherein the differential pressure regulator associated with its flow path controls the catalyst pressure in direct response to the resin pressure.

Unlike systems of the type disclosed above, there is no "loop" or circulating flow path for the components forming the coating material formulation in this invention. Instead, each of the components is transmitted within its own individual supply line or flow path, and a first mixer is employed to combine two of the components after which a second mixer adds the third component to the mixture of the first two to form the coating material formulation. The formulation is then transmitted directly from the second mixer to one or more dispensers. Control of the relative proportion of each of the components is therefore not dependent on any properties of the mixture or formulation. Rather, control of the resin-to-supercritical fluid and resin-to-catalyst ratios is predicated upon (1) a direct response to fluctuations in resin flow rate, and (2) a direct response to pressure fluctuations of the resin, both of which, in turn, are caused by variation in the demand for the coating material formulation.

Another aspect of this invention involves an improved color change capability. Because each of the components which form the coating material formulation are transmitted through independent flow paths, a color change operation can be performed with minimal down time and difficulty. Only the resin flow path need be cleaned in a color change procedure, as well as the mixers within which the resin is combined with supercritical fluid and catalyst, because the flow paths for the supercritical fluid and catalyst are isolated from the resin flow path. As a result, the introduction of solvent, air or other cleaning materials through the resin flow path can be accomplished rapidly, and the resin of one color can be replaced by resin of a different color, all within a short period of time and with minimal difficulty.

DESCRIPTION OF THE DRAWINGS.

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
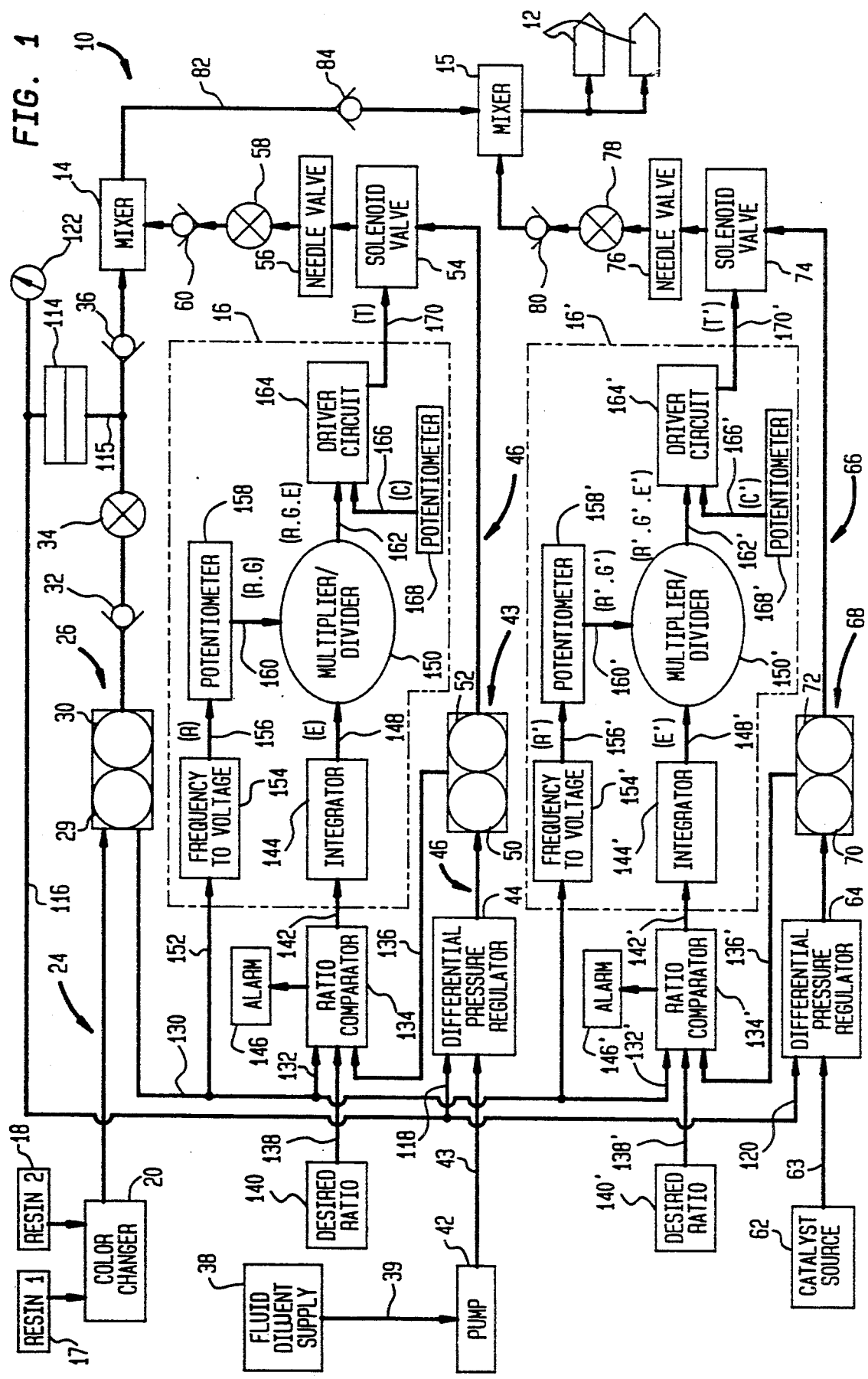
FIG. 1 is a schematic block diagram of the preferred embodiment of the apparatus of this invention.

The method and apparatus 10 of this invention is specifically intended to intermix three components, namely, (1) a liquid coating composition or resin, (2) a supercritical fluid which functions as a diluent, and (3) a catalyst, to form a coating material solution or formulation which is transmitted to one or more coating dispensers 12 for deposition onto a substrate (not shown). For purposes of the present discussion, the term "liquid coating composition" refers to a resin material such as paint which includes one or more components to be sprayed, applied or dispersed, and a solvent component. The term "supercritical fluid" as used herein is intended to refer to a gas in a supercritical state above its critical pressure and critical temperature wherein the gas has a density approaching that of a liquid material. It is also contemplated that liquified gases could be utilized in forming the resin, and therefore the term "liquified gas" may be substituted for "supercritical fluid" in the following description. The term "fluid diluent" as used herein is meant to refer interchangeably to supercritical fluids and liquified gases. The terms "coating material solution" and/or "coating material formulation" are used synonymously to refer to the mixture of a resin, supercritical fluid and a catalyst, wherein the fluid diluent is substantially dissolved in the resin to form a solution or at least an emulsion or dispersion.

A "coating dispenser", "dispenser" or "spray gun" as used herein will normally be an airless-type spray gun capable of handling the fluid pressure utilized in the apparatus 10. Preferably, the dispensers are airless-type spray guns of the type disclosed in U.S. Pat. No. 5,106,659 to Hastings et al., which is owned by the assignee of this invention and which is hereby incorporated by reference in its entirety herein. Alternatively, air-assisted airless-type spray guns can be used such as are shown in U.S. Pat. No. 3,843,052 to Cowan.

The purpose of the supercritical fluid and/or liquified gas is to act as a fluid diluent for the coating composition so that the proportion or percentage of organic solvents in the liquid coating composition can be reduced, e.g. by about two-thirds, compared, for example, to most commercially available high solids liquid coating compositions such as paint. A number of compounds in a supercritical or liquified state can be intermixed with a liquid coating composition such as paint or resin to produce the coating material solution or formulation when mixed with catalysts as described below. These compounds include carbon dioxide, ammonia, water, nitrogen oxide ($N_2O$), methane, ethane, ethylene, propane, pentane, methanol, ethanol, isopropanol, isobutanol, chlorotrifluoromethane, monofluoromethane and others. For purposes of the present discussion, supercritical carbon dioxide is employed because of its nontoxic nature and because its critical temperature and critical pressure of 85° F. and 1070 psi, respectively, are well within the operating ranges of standard airless spraying systems including the apparatus 10 of this invention.

The overall construction of the apparatus 10 is first discussed below, followed by description of its operation including an initial calibration procedure.

System Construction

With reference to FIG. 1, the top portion of the drawing depicts a resin flow path, the center portion of the drawing illustrates a supercritical fluid flow path, and the bottom portion shows a catalyst flow path. As described in more detail below, resin and supercritical fluid are directed to a first mixer 14 where they are intermixed and then transmitted to a second mixer 15 for combination with the catalyst. Flow of supercritical fluid to the first mixer 14 is controlled by an analog controller 16, and flow of catalyst to the second mixer 15 is governed by an analog controller 16' in a manner described below. See dotted lines in FIG. 1. The construction of the flow path for each component is described individually below, followed by a discussion of the control of supercritical fluid and catalyst flow.

Considering first the resin flow path, the boxes entitled "Resin 1" and "Resin 2", labelled with reference numbers 17 and 18, respectively, refer to a tank or other container including a pump (not shown) which supply resin of different colors to a color changer 20 of the type disclosed in U.S. Pat. No. 4,657,047 to Kolibas, which is owned by the assignee of this invention. As explained in U.S. Pat. No. 4,657,047, the color changer 20 is effective to discharge a selected one of the resins from sources 17 or 18 and transmit such resin into a resin supply line 24. The resin flows through resin supply line 24 into a flow meter 26, preferably of the type having intermeshing sets of gear teeth 28 and 30 as depicted schematically in FIG. 1. A suitable flow meter 26 is commercially available from the AW Company of Racine, Wis. under Model No. ZHM 02/1. A metered quantity of resin is emitted from flow meter 26 into supply line 24 where it passes through a first check valve 32, a resin shut-off valve 34 and a second check valve 36 to the mixer 14. The purpose of the check valves 32, 36 is to prevent any back flow of resin downstream from the mixer 14 toward the flow meter 26. The resin shut-off valve 34 is provided to stop the flow of resin to the mixer 14, if necessary, such as when operation of the apparatus 10 is shut down for any purpose.

As noted above, the supercritical fluid flow path is depicted at the center of FIG. 1. It includes a metal cylinder or tank 38 which supplies fluid diluent, e.g. liquified carbon dioxide, through a line 39 at a pressure of about 800 psi and temperature of about 75° F. (ambient) to a pump 42 which increases its pressure to about 2,000 psi, i.e. well above the 1070 psi critical pressure needed to form supercritical carbon dioxide. Preferably, the pump 42 is a Model DSF35 pump sold by the Haskell Company of Burbank, Calif. The pump 42 discharges the now supercritical carbon dioxide through line 43 to a differential pressure regulator 44, preferably of the type sold under Model No. S4-2000 by Tescom of Elk River, Minn.

The supercritical fluid is emitted from differential pressure regulator 44 through a supply line 46 to a flow meter 48, which, in the illustrated embodiment, includes two sets of intermeshing gears 50 and 52 which emit a metered quantity of supercritical fluid into the fluid supply line 46 downstream therefrom. One type of flow meter suitable for use is commercially available from the AW Company of Racine, Wis. under Model No. ZHM 01. Although a gear meter type flow meter 48 is illustrated in FIG. 1, it is contemplated that other types of flow metering devices could be employed within the supercritical fluid flow path such as a Model P21-Sect 10 flow metering device manufactured by the Micro Motion Company of Boulder, Colo.

The metered flow of supercritical carbon dioxide emitted from flow meter 48 is transmitted through supply line 46 to a solenoid valve 54 and then into a needle valve 56. The operation of valves 54 and 56 is described in detail below in connection with a discussion of the operation of apparatus 10. Preferably, the solenoid valve 54 is a Model SSHB54 manufactured by the Whitely Company of Highland Heights, Ohio. A Model No. SS2-A valve manufactured by Nupro Swagelock Company of Willouby, Ohio is a suitable type of needle valve. From the needle valve 56, the supercritical carbon dioxide flows through a catalyst shut-off valve 58 and a third check valve 60 to the mixer 14 where it is intermixed with the resin to form a mixture wherein the supercritical carbon dioxide is substantially dissolved in the resin to form a solution, or at least an emulsion or dispersion. The purpose of check valve 60 is to prevent any back flow of supercritical fluid in a downstream direction toward the needle valve 56, and the shut-off valve 58 is included to provide a complete discontinuance of supercritical fluid flow to the mixer 14.

With reference to the bottom portion of FIG. 1, the catalyst flow path comprises a catalyst source 62, shown schematically as a block, which is intended to represent a tank and pump (not shown) for delivering catalyst, under pressure, through a line 63 to a differential pressure regulator 64 preferably of the type manufactured by Tescom of Elk River, Minn. under Model No. 54-2000. From the differential pressure regulator 64, the catalyst is delivered into line 66 at a pressure which is directly proportional to, but greater than the resin pressure, i.e. about 100 to 300 psi greater. The pressurized catalyst enters a flow meter 68, which, in the illustrated embodiment, includes two sets of intermeshing gears 70 and 72 capable of emitting a metered quantity of catalyst into the supply line 66 downstream therefrom. One type of flow meter suitable for use is commercially available from A. W. Company of Racine, Wis. under Model No. ZHM01. The metered flow of catalyst emitted from flow meter 68 is transmitted through supply line 66 to a solenoid valve 74 and then into a needle valve 76, whose operation is described below. Preferably, the solenoid valve 54 is of the type sold by Nordson Corporation of Westlake, Ohio under Model No. A-10-A, and the Model No. SS2-A valve manufactured by Nupro Swagelock Company of Willouby, Ohio is a suitable type of needle valve. Once discharged from the needle valve 76, the catalyst flows through a catalyst shut-off valve 78 and a third check valve 80 to the second mixer 15 where it is intermixed with the mixture of resin and supercritical fluid to form a coating material formulation for transmission to the dispensers 12. As in the supercritical fluid flow path, the purpose of check valve 80 is to prevent any backflow of catalyst in the downstream direction toward the needle valve 76, and the shut-off valve 78 is included to provide for a complete shut-off of catalyst flow if necessary.

In the presently preferred embodiment, a diaphragm seal 114 is connected by a tap line 115 to the resin supply line 24 within the resin flow path. The output side of diaphragm seal 114 is connected to a transfer line 116 which, in turn, is connected by a line 118 to the differential pressure regulator 44 associated with the supercritical carbon dioxide flow path, and, by a line 120 to the differential pressure regulator 64 associated with the catalyst flow path. The diaphragm seal 114 produces an "output signal", i.e. a pressurized flow of liquid through transfer line 116, which is representative of the pressure of the resin within resin supply line 24. Such pressure level can be visually monitored by a pressure gauge 122 connected along the transfer line 116.

Each of the differential pressure regulators 44 and 64 function to discharge supercritical carbon dioxide and catalyst, respectively, in direct proportion to the resin pressure within resin line 24. The differential pressure regulator 44, for example, receives the output signal from diaphragm seal 114 via transfer line 116 and line 118, and is effective to discharge supercritical carbon dioxide into the fluid supply line 46 at a pressure which is directly proportional to the resin pressure but in excess of 1070 psi, i.e. the critical pressure of supercritical carbon dioxide. Similarly, the differential pressure regulator 64 associated with the catalyst flow path receives the signal from diaphragm seal 114 and emits a flow of catalyst into the catalyst supply line 66 having a pressure directly proportionate to the resin pressure within line 24. The relative proportion or ratio between resin pressure, supercritical carbon dioxide pressure and catalyst pressure is set within the differential pressure regulators 44 and 64, respectively. These settings are dependent upon such factors as the fluid properties of the resin, the desired volumetric ratio of resin-to-supercritical carbon-dioxide and resin-to-catalyst, and, the flow rate of such components required for combination with the resin.

Mixer Construction

As noted above, the first mixer 14 functions to intermix the resin and supercritical carbon dioxide to form a solution, or at least an emulsion or dispersion, which is then transferred via a line 82 through a check valve 84 to the second mixer 15 for combination with the catalyst. The construction of mixers 14 and 15 are identical, and, for purposes of discussion, only the mixer 14 is illustrated and described in detail herein.

Figure 2:
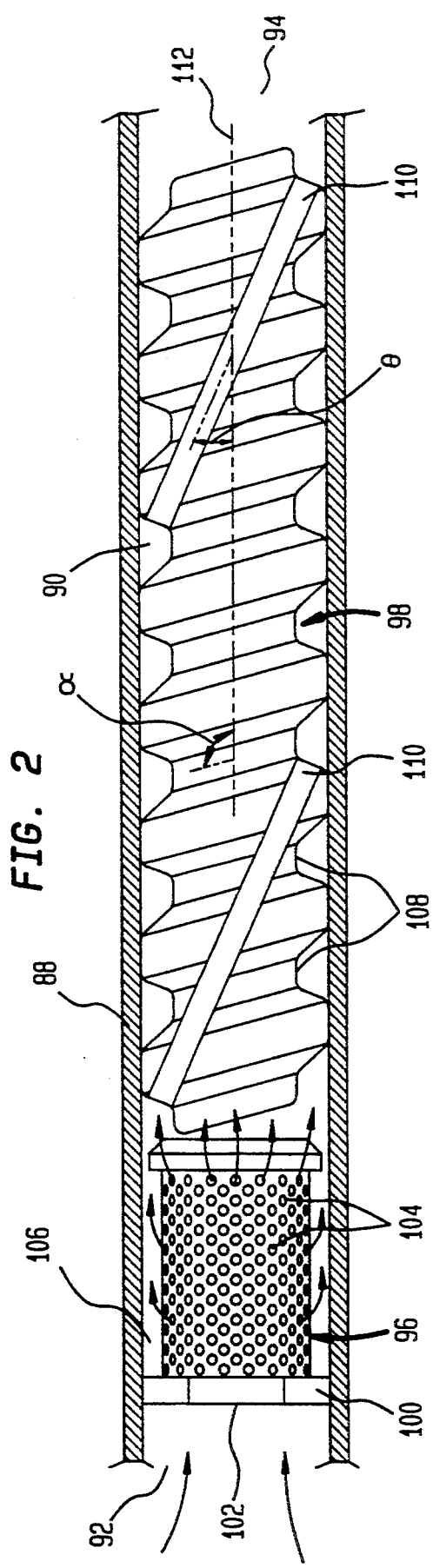
FIG. 2 is a cross-sectional view of one of the mixers depicted in FIG. 1.

Referring now to FIG. 2, the mixer 14 includes a mixer tube 86 having a wall 88 defining an interior 90 including an inlet end 92 and an outlet end 94. The mixer tube interior 90 receives two elements, namely, a premix screen 96 and a mixer rod 98 located downstream from the premix screen 96. The premix screen 96 is cylindrical in shape having an annular flange 100 at one end which contacts the tube wall 88, a central throughbore 102 and a plurality of screen openings 104 extending radially outwardly from the central throughbore 102. As depicted by the arrows in FIG. 2, the supercritical carbon dioxide and resin are introduced into the inlet end 92 of mixer tube 86 and flow into the central throughbore 102 of premix screen 96. A portion of the resin and supercritical carbon dioxide flows along the central throughbore 102, and the remainder moves radially outwardly therefrom through the screen openings 104 into an annular space or gap 106 between the exterior surface of premix screen 96 and the tube wall 88 of mixer tube 86.

As mentioned above, the mixer rod 98 is located downstream from premix screen 96 within the mixer tube interior 90. In the presently preferred embodiment, the exterior surface of mixer rod 98 is formed with a first set of threads or channels 108 and a second set of threads or channels 110, both of which extend in the longitudinal direction of the mixer rod 98. The channels 108 are pitched at an angle $\alpha$ on the order of about 75° relative to the longitudinal axis 112 of mixer rod 98, whereas the channels 110 are pitched at an angle $\Theta$ of approximately 50° with respect to the longitudinal axis 112. As a result, a shorter flow path is provided by channels 110, compared to channels 108, measured along the longitudinal extent of mixer rod 98. This is because resin, supercritical carbon dioxide and/or a mixture thereof must flow along the steeper angled channels 108, and thus make less progress axially along the length of mixer tube 86 over a given time period, than liquid flowing along the lesser angled channels 110. One purpose of the different pitches of channels 108 and 110 is to provide an opportunity for the supercritical carbon dioxide and/or resin to "catch up" with one another, i.e. move more quickly along the axial length of mixer tube 86, so that in the event the resin has been introduced into the mixer 14 either before or after the supercritical carbon dioxide, it is nevertheless assured that the resin will intermix with the supercritical carbon dioxide before exiting the mixer tube 86. Another purpose of the different pitches of channels 88, 90 is to provide for a flow division and mixing at every point of intersection of the two pitches. Mixing is accomplished by the constant change of direction of the liquids, i.e. a circulating and linear motion combined with a flow division.

Analog Controller and System Operation

As described above, the resin flow path, supercritical fluid flow path and catalyst flow path are interconnected such that the supercritical fluid and catalyst pressures "track" i.e., are directly responsive to, the resin pressure. This provides a rapid adjustment of the ratios of resin-to-supercritical fluid and resin-to-catalyst. Primary control of such ratios is obtained by tracking or matching the supercritical fluid and catalyst flow rates with the flow rate of resin to the mixers 14, 15. Such control function is provided by the analog controllers 16 and 16'.

As depicted in FIG. 1, an analog controller 16 is associated with the supercritical fluid flow path, whereas analog controller 16' is associated with the catalyst flow path. Both of these controllers 16 and 16' are operatively connected to the resin flow path, and are structurally and functionally identical. For purposes of the present discussion, only the analog controller 16 is described in detail, and the same structure contained within the controller 16' is given the same reference numbers with the addition of a "prime" thereto.

With reference to the top portion of FIG. 1, a first line 130 extends from the resin flow meter 26 which is connected by a line 132 to a ratio comparator 134, and by a line 132' to a ratio comparator 134' associated with the catalyst flow path. A second line 136 is connected between the flow meter 48 and the ratio comparator 134. Line 130 transmits an output representative of the actual flow of resin from resin flow meter 26, and line 136 transmits the actual flow of supercritical carbon dioxide from flow meter 48. A third line 138 provides an input to ratio comparator 134 from a block 140 which is representative of the desired ratio of resin flow to supercritical carbon dioxide flow. Block 140' associated with the catalyst flow path and analog controller 16' provides a signal representative of the desired resin-to-catalyst ratio. The ratio comparator 134 is effective to compare the desired ratio of resin-to-supercritical carbon dioxide flow with the actual flow ratio (from lines 130 and 136), and produce an output represented by line 142 to an integrator 144. The output of ratio comparator 134 is also input to an alarm, depicted by box 146 in FIG. 1, which provides a visual or audio indication of a problem situation, i.e. wherein the difference between the desired and actual resin-to-supercritical fluid ratio exceeds a predetermined level or percentage. One suitable ratio comparator 134 is available from the AW Company of Racine, Wis. under Model No. EMO-600.

The integrator 144 is operative to take the integral of the signal input from ratio comparator 134 over a selected time period and produce an output "E" which is representative of the error or difference between the desired and actual resin-to-catalyst ratio. This error signal E is then input through line 148 to a multiplier 150.

A line 152, connected to the resin flow meter 26 through line 130, transmits a signal representative of the resin flow to a frequency-to-voltage converter depicted schematically by block 154 in FIG. 1. The converter 154 converts the output from resin flow meter 26 to a voltage signal "R" which is representative of the resin flow within resin supply line 24. The voltage output R from converter 116 is input through line 156 to a potentiometer 158 of essentially any commercially available type. The potentiometer 158 multiplies the voltage signal R by a gain factor G, the purpose of which is described below. The resulting output from potentiometer 158, R times G, is then input through line 160 to the multiplier 150. The multiplier 150, in turn, produces an output which is the product of the error signal (E) from integrator 144 and the output (R.G) from potentiometer 158. This output (E.R.G) from multiplier 150 is input through line 162 to a valve driver circuit 164 of the type sold by Nordson Corporation of Westlake, Ohio under Model No. FET-4. The driver circuit 164 combines the output from multiplier 150 (E.R.G) with an offset value "C", which is input through line 166 from a potentiometer 168. The magnitude of this offset value C is determined during a system calibration procedure described below. The output of driver circuit 164, represented by the time factor T described below, is then input to the solenoid valve 54 through line 170 to control the duty cycle thereof, i.e. the time during which the solenoid valve 54 is opened and closed. As noted above, the analog controller 16' contains the same elements as controller 16, which function in the same manner described above.

Calibration Procedure

Having described the general construction of the analog controllers 16 and 16', the initial set-up procedure for apparatus 10 can be discussed. The purpose of the initial set-up or calibration procedure is to provide an adjustment of the "on-time" T of solenoid valve 54 and the on-time T' of solenoid valve 74, in order to account for the fluid properties of a particular resin and catalyst to be dispensed, and to compensate for the time it takes the solenoid valves 54 and 74 to open and obtain a stabilized flow therethrough, and to close, after receiving a signal from their respective driver circuits 164 and 164'. It was recognized that in order to get an accurate ratio of resin-to-supercritical fluid and resin-to-catalyst for all spraying conditions of apparatus 10, i.e. wherein different numbers of dispensers 12 are actuated at different times, an offset or time correction factor must be determined in a pre-operation, set-up procedure to properly control the open or on time of the solenoid valves 54 and 74.

Figure 3:
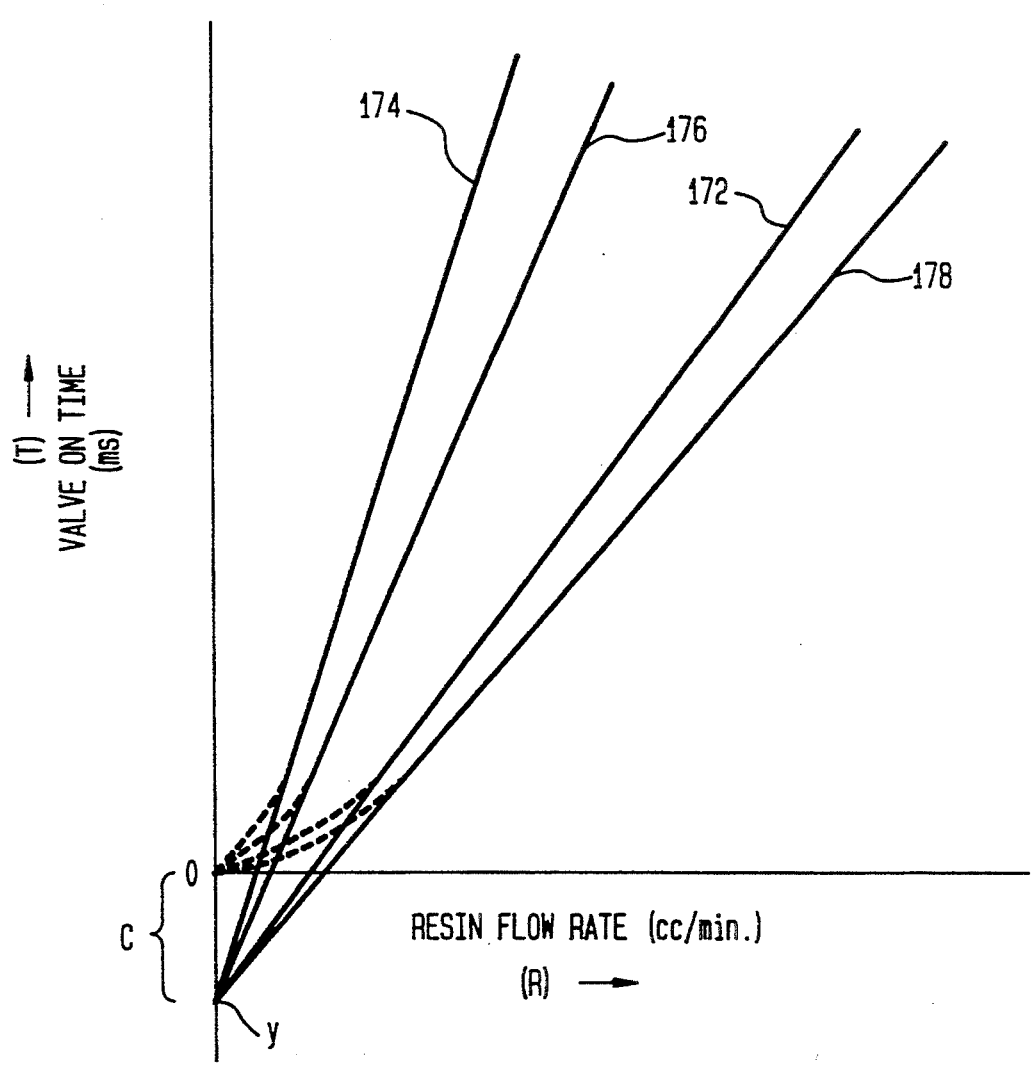
FIG. 3 is a graph of valve on time vs. resin flow obtained during the initial set-up operation of the apparatus of FIG. 1.

With reference to FIG. 3, a graph is depicted whose ordinate represents valve "on time" (T), and whose abscissa represents resin flow (R). The calibration procedure described below produces the family of curves shown on the graph, all of which intersect at a point Y below the origin of the ordinate and abscissa. The point Y is representative of a time period correction factor "C" which is input to the driver circuit 164 in order to produce the output T which controls the duty cycle of solenoid valve 54. The various curves depicted on the graph of FIG. 3 are all of the standard polynomial form, $y = mx + b$, and are derived from the following formula:

$$T = (E)(R)(G) - C \tag{1}$$

Where:
T = Supercritical fluid or solenoid valve 54, 74 on time
E = Error signal or difference between desired and actual resin-to-supercritical fluid flow or resin-to-catalyst flow
R = Resin flow
G = Gain C=Offset or time correction factor A similar set of curves can be generated which is representative of the relationship between the on-time T' of the catalyst solenoid valve 74 and the resin flow in order to determine an offset or time delay value C' associated with the catalyst flow path. For ease of discussion, the calibration procedure employed to obtain the value C associated with the supercritical fluid path is described, it being understood that the same type of procedure is used to obtain the offset value C'.

The initial set-up or calibration procedure is begun by the operator initiating the lowest flow condition of apparatus 10, i.e. one of the coating dispensers 12 is turned on resulting in a flow of resin through resin supply line 24, and a flow of supercritical through fluid supply line 46. The operator then adjusts the potentiometer 168 so that the "C" value, or time delay, is in the range of about 15 to 20 milliseconds (ms.). This initial "C" value is chosen because the solenoid valve 54 cycles in 100 ms., e.g. at an operating frequency of 10 Hz, and it has been found that it takes on the order of about 10 to 20 ms. for the solenoid valve 54 to completely open and obtain a stable flow of supercritical fluid therethrough. It is contemplated that a different initial "C" value would be chosen for other solenoid valves having a different cycle time, so long as such C value is at least sufficient in duration to allow the solenoid valve to stabilize.

The operator next manually adjusts the orifice (not shown) of needle valve 56 until such time as the desired ratio of resin-to-supercritical carbon dioxide is read on the ratio comparator 134. As noted above, the ratio comparator 134 is connected to both the resin flow meter 26 and supercritical fluid flow meter 48, and it is operative to produce a visual read-out of the actual ratio of the flow of resin-to-supercritical carbon dioxide. Assuming a 5:1 ratio is desired, for example, manipulation of the needle valve 56 continues until a 5:1 reading is obtained on the ratio comparator 134. At that time, a second dispenser 12 is turned on by the operator. This produces a different set of flow conditions for both the resin and supercritical carbon dioxide, but the same ratio of resin-to-supercritical carbon dioxide must be maintained. In order to maintain the same ratio, the operator adjusts the gain value "G" by manipulating potentiometer 158 until such time as the reading from the ratio comparator 134 is 5:1.

The gain value "G" is a voltage which is indicative of the slope of the lines on the graph of FIG. 3, i.e. the higher the gain, the steeper the slope and vice versa. Because the gain G affects the C value for a constant on-time T of valve 54, as reflected in Equation (1) above, adjustment of the gain via potentiometer 158 may produce a line on the graph of FIG. 3 which does not intersect the ordinate of the graph where the initial estimated value C was set by potentiometer 168. In order to obtain the actual C value, the operator shuts off the second dispenser 12, allowing the first dispenser 12 to continue spraying, and reads the actual ratio of resin-to-supercritical carbon dioxide from the ratio comparator 134. If the reading is not 5:1, in this example, the operator adjusts the C value by manipulating potentiometer 168 until a 5:1 reading is obtained. As a precaution, to ensure that the correct C value has now been set, the operator may again turn on the second dispenser 12 to make sure the ratio of resin-to-supercritical carbon dioxide remains at 5:1 with the adjusted settings of potentiometers 158 and 168.

The objective of this set-up or calibration procedure is therefore to obtain a straight-line relationship between solenoid valve 54 "on" time T and resin flow R, at a given resin-to-supercritical carbon dioxide ratio, regardless of whether one, two or more dispensers 12 are operating. Because of inherent delays created by the fluid properties of the resin, and the time required for the solenoid valve 54 to open after it receives a signal from driver circuit 164 and produce a stabilized flow therethrough, a system time delay correction or offset C must be factored into the driver circuit 164 operation which is graphically represented by a negative value C on the ordinate of the graph in FIG. 3. Assuming line 172 on the graph of FIG. 3 represents a resin-to-supercritical fluid ratio of 5:1, the lines 174 and 176 having a steeper slope are representative of lower ratios (4:1 or less) and the line 178 having a flatter slope is representative of higher ratios (6:1 or greater). It is noted that each of these other lines 174, 176 and 178 also pass through the point Y on the graph, and, therefore, such lines can be generated by maintaining the settings of potentiometer 158 (gain G) and potentiometer 168 (time C) obtained during the set-up procedure, and manipulating the needle valve 56. Such manipulation of valve 60 merely changes the ratio of resin-to-supercritical fluid, and, hence, the slope of such lines 174, 176 and 178.

The dotted lines depicted in FIG. 3 are representative of the actual relationship between valve-on time and resin flow for the apparatus 10, for each of these resin-to-supercritical fluid ratios depicted by lines 172, 174, 176 and 178, during approximately the first 10 ms. after the solenoid valve 54 has received a signal from driver circuit 164 to open. After about 10 ms., flow through the solenoid valve 54 has stabilized, and it is assumed that a straight-line relationship between valve-on time and resin flow is present thereafter.

It should be understood that an essentially identical calibration procedure is undertaken to set the value C' associated with the catalyst flow path of apparatus 10. After the C value is set for the proper resin-to-supercritical fluid ratio, the mixture of resin and supercritical carbon dioxide is transmitted to mixer 15 where it is combined with the catalyst and discharged to dispenser 12. The dispensers 12, potentiometers 158', 168' and needle valve 76 are then operated in the same manner as their counterparts described above to obtain the offset or time delay C' for the catalyst flow path portion of the apparatus 10.

Once the apparatus 10 is calibrated in the manner described above, normal operation proceeds with essentially no further manual adjustment required. In response to actuation of one or more coating dispensers 12, resin from the resin source 18 is transmitted through resin supply line 24 and the remainder of the resin flow path described above to the mixer 14. The pressure at which the resin is delivered through line 24 is sensed by the diaphragm seal 114, and such pressure level is input to the differential pressure regulator 44 within supercritical fluid supply line 46 and the differential pressure regulator 64 within the catalyst supply line 66. The differential pressure regulators 44 and 64 emit the supercritical fluid and catalyst, respectively, at predetermined, proportionate pressure levels to the flow meter 48 and 68 which, in turn, provides a metered flow of catalyst to their associated solenoid valves 54 and 74.

The analog controller 16 associated with the supercritical fluid flow path is effective to provide two control functions involving the duty cycle of the catalyst or solenoid valve 54, i.e. (1) an essentially immediate opening of the solenoid valve 54 when one or more dispensers 12 are operated, and (2) a periodic, relatively "slow" adjustment of the duty cycle of the solenoid valve 54 dependent on the error signal E generated as described above. Because the resin flow meter 26 is connected by lines 30 and 152 to the analog controller 16, a signal representative of resin flow through the flow meter 26 is transmitted to controller 16 immediately upon movement of the gears 28, 30 therein, i.e. as soon as resin flows through flow meter 26 in response to opening of one or more dispensers 12. This signal is processed by frequency-to-voltage converter 154, potentiometer 158, multiplier/divider 150 and driver circuit 164 to produce an essentially instantaneous signal through line 170 which opens solenoid valve 54. An accurate volume of catalyst, which is directly proportional to the flow of resin through flow meter 26, is allowed to pass through solenoid valve 54 because the appropriate values for G and C had been previously set during the calibration described above. As a result, the volume of supercritical fluid transmitted to mixer 14 is accurately controlled, and there is essentially no delay in obtaining the appropriate proportion thereof for transmission to the mixer 15. Similarly, the analog controller 16' is connected by lines 130 and 152' to the resin flow meter 26. The analog controller 16' is operative in the same manner described above to essentially immediately open the solenoid valve 74, in response to flow of resin through flow meter 26, such that the appropriate volume of catalyst is transmitted to the mixer 15 for combination with the mixture of resin and supercritical fluid.

A second control function provided by the analog controllers 16 and 16' involves adjustment of the duty cycle of the solenoid valves 54 and 74, respectively, at periodic intervals while the apparatus 10 is operating. Depending upon the setting of the ratio comparators 134 and 134', such adjustment is made at relatively "long" intervals of time, such as on the order of about 10 seconds. This second control operation is therefore primarily a relatively minor and comparatively infrequent "trim" or adjustment of supercritical fluid and catalyst flow, which are otherwise controlled in response to signals from the resin flow meter 26 as discussed above.

As noted above, the ratio comparator 134, for example, receives signals representative of the resin flow rate from flow meter 26 and of the supercritical fluid flow rate from flow meter 48. The ratio comparator 134 functions to make a comparison between the actual ratio of the flow rates of supercritical fluid and resin, and the desired ratio. In the event the actual ratio varies from the desired ratio, an output is produced by ratio comparator 134 which is input to integrator 146, i.e. at intervals of about 10 seconds, and the integrator 146, in turn, produces an error signal E. This error signal E is then multiplied within the multiplier 150 by the product of resin flow rate R and gain G, output from the potentiometer 158, as described above. The output from multiplier 150 is input to driver circuit 164 where it is combined with the output from potentiometer 168, i.e. the "C" value or time delay correction factor determined during the calibration procedure. The driver circuit 164 essentially subtracts the value C from the input from multiplier 150 (E.R.G), in accordance with Equation (1) above, to produce an output T which is representative of the "on" time required of the solenoid valve 54 in order to introduce the proper volume of supercritical carbon dioxide to mixer 14. Depending upon the sensed error, the solenoid valve 54 is either opened for a shorter or longer time period, thus controlling the volume of supercritical carbon dioxide supplied to the mixer 14. The resin and catalyst are intermixed within the mixer 14, which, as described above, is constructed to allow for some degree of "catch up" or faster movement of supercritical fluid and/or supercritical fluid therethrough, so that such components are intermixed prior to transmission to the second mixer 15.

The analog controller 16' operates in the same manner as controller 16 to control the duty cycle of the solenoid valve 74 associated with the catalyst flow path. The R', G', E' and C' values are all processed in the identical manner to obtain a time T', output from driver circuit 164', which controls solenoid valve 74. As a result, an accurately controlled proportion of both resin-to-supercritical fluid and resin-to-catalyst is obtained, independently of one another, during operation of apparatus 10.

One important advantage of the above-described construction and operation of apparatus 10 is that it is sensitive and rapidly adjustable to account for fluctuations in resin flow and pressure created by varying demands for liquid coating formulation. Depending upon the requirements of a particular application, one coating dispenser 12 may be operating at a given time and then several dispensers 12 may be actuated in order to provide the desired coverage on objects to be coated. Moreover, different numbers of dispensers 12 may be intermittently turned on and off, thus further creating widely-fluctuating demand for the liquid coating composition. Depending upon how many dispensers 12 are opened, a corresponding flow and pressure fluctuation is produced in the resin supply line 24 which is "tracked", or proportionately matched, within each of the analog controllers 16, 16', and in the differential pressure regulators 44 and 64, so that a proper volume of supercritical carbon dioxide and catalyst is supplied to mixers 14 and 15 for combination with the resin. And, such control of the supply of supercritical carbon dioxide and catalyst is obtained immediately, without reference to any parameter of the mixture of such components, because (1) each of the analog controllers 16, 16' immediately process signals received from the resin flow meter 26 and control solenoid valves 54, 74, and (2) the differential pressure regulators 44 and 64 receive an immediate "signal" via transfer line 116 representative of pressure fluctuations within resin supply line 24 and then react to vary the pressure of the supercritical carbon dioxide and catalyst accordingly. As a result, the ratios of resin-to-supercritical carbon-dioxide, and resin-to-catalyst, can be accurately maintained even at levels on the order of 100 to 1, and, comparatively low flow rates of either the supercritical carbon dioxide or catalyst can be accurately maintained, e.g. on the order of 3 ccm/min.

When it is desired to change from one colored resin to another, the color changer 19 is operated to first clean the apparatus 10 of old resin before a second colored resin, such as resin 2 depicted in box 18, is introduced. As noted above, color change is made rapidly and efficiently in the apparatus 10 herein because a comparatively small amount of the system is directly exposed to the resin. Only the resin flow path and the elements associated therewith need be cleaned, i.e. the resin regulator 22, valves 32, 34, 36 and 84, mixers 14, 15, and dispensers 12, as well as the resin supply line 24.

None of the lines or other system elements associated with the supercritical fluid flow path or catalyst flow path come into contact with the resin except at the mixers 14 and 15. Accordingly, the color change operation can be performed in a short period of time while the flow of the supercritical fluid and catalyst is temporarily shut down, such as by closing shut-off valves 58 and 78, respectively.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, while the apparatus 10 is shown with the supercritical fluid being intermixed with the resin prior to addition of the catalyst, the order of mixing is not considered to be critical and could be reversed. That is, the catalyst could be mixed with the resin prior to introduction of the supercritical fluid. Additionally, it is contemplated that more than three components could be intermixed in accordance with the teachings of this invention, if required in a particular application, by simply adding additional flow paths, analog controllers and mixers having essentially the same construction as those described above.

Therefore, it is intended that the invention not be limited to the particular embodiment disclosed as the best mode contemplated for carrying out this invention, but that the invention will include all the embodiments falling within the scope of the appended claims.

We claim:

1. Apparatus for controlling the relative proportion of resin and supercritical fluid within a coating material formulation, comprising:
   a mixer for combining the resin and supercritical fluid to form the coating material formulation;
   a first flow path for supplying the resin to said mixer, said first flow path including a first pressure regulator for controlling the pressure of the resin;
   a sensor operative to sense the pressure at which the resin is supplied to the mixer, and to provide a signal representative of said pressure;
   a second flow path for supplying the supercritical fluid to said mixer, said second flow path including a differential pressure regulator which is effective to adjust the pressure of the supercritical fluid, dependent on said signal, while maintaining said pressure above the critical pressure of said supercritical fluid.

2. Apparatus for controlling the relative proportion of a resin and a supercritical fluid within a coating material formulation, comprising:
   a mixer for combining the resin and supercritical fluid to form the coating material formulation;
   a first supply for supplying the resin at a first pressure and a first flow rate to said mixer;
   a sensor operative to sense the pressure of said resin within said first supply, and to provide a pressure signal representative of said pressure;
   a second supply for supplying the supercritical fluid to said mixer at a second pressure and a second flow rate, said second supply including a pressure adjustment device which adjusts said second pressure of the supercritical fluid dependent on said pressure signal while maintaining said second pressure in excess of the critical pressure of the supercritical fluid;
   a valve, connected between said second supply means and said mixer, for turning on and off the flow of the supercritical fluid to said mixer;
   a controller for controlling the operation of said valve dependent on said first flow rate of said resin.

3. The apparatus of claim 2 in which said controller comprises electrical circuitry operative to process a signal representative of said first flow rate and produce an output which controls the duty cycle of said valve.

4. Apparatus for controlling the relative proportion of a resin and a supercritical fluid within a coating material formulation, comprising:
   a mixer for combining the resin and supercritical fluid to form the coating material formulation;
   a first supply for supplying the resin at a first pressure and a first flow rate to said mixer;
   a sensor operative to sense the pressure of said resin within said first supply, and to provide a pressure signal representative of said pressure;
   a second supply for supplying the supercritical fluid to said mixer at a second pressure and a second flow rate, said second supply including a pressure adjustment device which adjusts said second pressure of the supercritical fluid dependent on said pressure signal while maintaining said second pressure in excess of the critical pressure of the supercritical fluid;
   a controller operative to compare the ratio of said first flow rate to said second flow rate with a predetermined ratio of said first and second flow rates, and to produce a signal representative of said comparison;
   a valve, connected between said second supply and said mixer, for controlling the flow of the supercritical fluid into said mixer dependent on said signal.

5. The apparatus of claim 4 in which said second supply includes:
   a supercritical fluid flow meter connected to said valve;
   a differential pressure regulator operative to control the pressure at which the supercritical fluid is supplied to said flow meter dependent on said pressure signal from said sensor.

6. The apparatus of claim 5 in which said controller comprises:
   first electrical components, connected to said first supply means and to said supercritical flow meter, for comparing the actual ratio of said first flow rate to said second flow rate with a desired ratio and for producing an error signal representative of the difference between said actual ratio and said desired ratio; and
   second electrical components for adjusting the duty cycle of said valve dependent on said error signal.

7. Apparatus for controlling the relative proportion of a resin, a supercritical fluid and a third component within a coating material formulation, comprising:
   a first mixer for combining the resin and supercritical fluid to form a first mixture;
   a first flow path for supplying the resin to said mixer, said first flow path including a first pressure regulator for controlling the pressure of the resin;
   a sensor operative to sense the pressure at which the resin is supplied to said first mixer, and to provide a signal representative of said pressure;

a second flow path for supplying the supercritical fluid to said mixer, said second flow path including a first differential pressure regulator which is effective to adjust the pressure of the supercritical fluid dependent on said signal while maintaining said pressure above the critical pressure of said supercritical fluid;

a second mixer for combining said first mixture of resin and supercritical fluid with the third component;

a third flow path for supplying the third component to said second mixer, said third flow path including a second differential pressure regulator which is effective to adjust the pressure of the third component dependent on said signal from said sensor.

8. Apparatus for controlling the relative proportion of a resin, a supercritical fluid and a third component within a coating material formulation, comprising:

a first mixer for combining the resin and supercritical fluid to form a first mixture;

a first supply for supplying the resin at a first pressure and a first flow rate to said first mixer;

a sensor operative to sense the pressure of said resin within said first supply, and to provide a pressure signal representative of said pressure;

a second supply for supplying the supercritical fluid to said first mixer at a second pressure and a second flow rate, said second supply including a pressure adjustment device which adjusts said second pressure of said supercritical fluid dependent on said pressure signal while maintaining said second pressure in excess of the critical pressure of the supercritical fluid;

a first controller operative to compare the ratio of said first flow rate to said second flow rate with a predetermined ratio of said first and second flow rates, and to produce a first signal representative of said comparison;

a first valve, connected between said second supply and said mixer, for controlling the flow of the supercritical fluid into said first mixer dependent on said first signal;

a second mixer for combining said first mixture of resin and supercritical fluid with the third component;

a third supply for supplying the third component to said second mixer at a third flow rate and at a third pressure, said third supply including a pressure adjustment device which adjusts said third pressure of said third component dependent on said pressure signal from said sensor;

a second controller operative to compare the ratio of said first flow rate and said third flow rate with a predetermined ratio of said first and third flow rates, and to produce a second signal representative of said comparison;

a second valve, connected between said third supply and said second mixer, for controlling the flow of the third component into said mixer dependent on said second signal.

9. The apparatus of claim 8 in which each of said second and third supplies includes:

a flow meter connected to said first or second valves;
a differential pressure regulator.

10. The apparatus of claim 8 in which each of said first and second controllers comprises:

first electrical components for comparing the actual ratio of said first flow rate to one of said second and third flow rates, with a desired ratio thereof, and for producing an error signal representative of the difference between said actual ratio and said desired ratio;

second electrical components for adjusting the duty cycle of one of said first and second valves dependent on said error signal.

11. Apparatus for controlling the relative proportion of a first component and a second component within a coating material formulation, comprising:

a mixer for combining the first and second component to form the coating material formulation;

a first supply for supplying the first component at a first flow rate and a first pressure along a first flow path to said mixer;

a sensor operative to sense the pressure of said first component, and for providing a signal representative of said pressure;

a second supply for supplying the second component at a second flow rate and a second pressure along a second flow path, which is separate from said first flow path, to said mixer, said second supply including a pressure adjustment device which adjusts said second pressure of the second component dependent on said signal, and a flow rate adjustment device for adjusting the flow rate of the second component as a function of the flow rate of said first component;

color changer for introducing a first component of different color into said first flow path.

12. The apparatus of claim 11 further including:

a second mixer for combining a third component with the mixture of the first and second components;

a third supply for supplying the third component to said second mixer at a third flow rate which is dependent on said first flow rate of said first component.

13. The apparatus of claim 12 in which said third supply includes a pressure adjustment device which adjusts the pressure at which the third component is supplied to said second mixer dependent on said signal from said sensor.

14. Apparatus for controlling the relative proportion of resin and supercritical fluid within a coating material formulation, comprising:

a mixer for combining the resin and supercritical fluid to form the coating material formulation;

a first flow path for supplying resin to said mixer, said first flow path including a first pressure regulator for controlling the pressure of the resin and a first flow meter for controlling the rate at which the resin is supplied to said mixer;

a second flow path for supplying supercritical fluid to said mixer, said second flow path including;

(i) a second pressure regulator operative to maintain the pressure of the supercritical fluid above its critical pressure, (ii) a second flow meter for controlling the rate at which the supercritical fluid is supplied to the mixer, and (iii) a valve operative to turn on and off the flow of the supercritical fluid to said mixer;

an electronic controller connected to said first and second flow meters and to said valve, said electronic controller being effective to receive a signal from said first flow meter which is representative of the flow of resin through said first flow path, and, in response to said signal, to control the operation of said second flow meter and said valve so that a proportionate flow of supercritical fluid is transmitted to said mixer for combination with the resin.

15. The apparatus of claim 14 in which said second pressure regulator is a differential pressure regulator.

16. The apparatus of claim 14 in which said electronic circuitry includes components for calculating the ratio of the flow rate of resin within said first flow path to the flow rate of supercritical fluid within said second flow path and comparing said calculated ratio to a predetermined ratio, said components producing a signal representative of said comparison which controls the operation of said valve.

17. Apparatus for controlling the relative proportion of a resin, a supercritical fluid and a third component within a coating material formulation, comprising:
- a first mixer for combining the resin and supercritical fluid to form a first mixture;
- a first supply for supplying the resin at a first pressure and a first flow rate to said first mixer;
- a sensor operative to sense the pressure of said resin within said first supply, and to provide a pressure signal representative of said pressure;
- a second supply for supplying the supercritical fluid to said first mixer at a second flow rate and a second pressure;
- a first controller operative to compare the ratio of said first and second flow rates, and to produce a first signal representative of said comparison;
- a first valve, connected between said second supply and said mixer, for controlling the flow of the supercritical fluid into said first mixer dependent on said first signal;
- a second mixer for combining said first mixture of resin and supercritical fluid with the third component;
- a third supply for supplying the third component to said second mixer at a third flow rate and at a third pressure, said third supply including a pressure adjustment device which adjusts said third pressure of said third component dependent on said pressure signal from said sensor;
- a second controller operative to compare the ratio of said first flow rate and said third flow rate with a predetermined ratio of said first and third flow rates, and to produce a second signal representative of said comparison;
- a second valve, connected between said third supply and said second mixer, for controlling the flow of the third component into said mixer dependent on said second signal.

* * * * *